(12) United States Patent
Wang et al.

(10) Patent No.: US 12,356,014 B2
(45) Date of Patent: *Jul. 8, 2025

(54) MULTIPLE NEURAL NETWORK MODELS FOR FILTERING DURING VIDEO CODING

(71) Applicant: QUALCOMM Incorporated, San Diego, CA (US)

(72) Inventors: Hongtao Wang, San Diego, CA (US); Venkata Meher Satchit Anand Kotra, Munich (DE); Jianle Chen, San Diego, CA (US); Marta Karczewicz, San Diego, CA (US); Dana Kianfar, Diemen (NL); Auke Joris Wiggers, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,946

(22) Filed: Feb. 6, 2024

(65) Prior Publication Data

US 2024/0244265 A1 Jul. 18, 2024

Related U.S. Application Data

(63) Continuation of application No. 17/448,658, filed on Sep. 23, 2021, now Pat. No. 11,930,215.

(Continued)

(51) Int. Cl.
*H04N 19/70* (2014.01)
*H04N 19/172* (2014.01)
(Continued)

(52) U.S. Cl.
CPC .......... *H04N 19/70* (2014.11); *H04N 19/172* (2014.11); *H04N 19/192* (2014.11); *H04N 19/44* (2014.11); *H04N 19/80* (2014.11)

(58) Field of Classification Search
CPC .. H04N 19/117; H04N 19/172; H04N 19/176; H04N 19/192; H04N 19/44;
(Continued)

(56) References Cited

U.S. PATENT DOCUMENTS

2006/0227868 A1* 10/2006 Chen ...................... H04N 19/14
375/E7.181
2019/0273948 A1 9/2019 Yin et al.
(Continued)

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22,-Jul. 1, 2020, Jun. 29, 2020-Jul. 3, 2020, Online, (Motion Picture Expert Group or ISO/IEC JTC1/SC29/WG11), No. JVET-S2001-vH, Version 17, Sep. 4, 2020, XP030293002, 548 Pages.
(Continued)

*Primary Examiner* — Jessica M Prince
(74) *Attorney, Agent, or Firm* — Shumaker & Sieffert, P. A.

(57) ABSTRACT

An example device for filtering decoded video data includes a memory configured to store video data; and one or more processors implemented in circuitry and configured to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

19 Claims, 9 Drawing Sheets

Related U.S. Application Data

(60) Provisional application No. 63/085,092, filed on Sep. 29, 2020.

(51) Int. Cl.
*H04N 19/192* (2014.01)
*H04N 19/44* (2014.01)
*H04N 19/80* (2014.01)

(58) Field of Classification Search
CPC ........ H04N 19/70; H04N 19/80; H04N 19/82; H04N 19/86
See application file for complete search history.

(56) References Cited

U.S. PATENT DOCUMENTS

| | | | |
|---|---|---|---|
| 2019/0320175 A1* | 10/2019 | Mao | H04N 19/573 |
| 2020/0184603 A1* | 6/2020 | Mukherjee | G06T 5/50 |
| 2021/0044838 A1 | 2/2021 | Chen et al. | |
| 2021/0112248 A1 | 4/2021 | Zhang et al. | |
| 2022/0103864 A1 | 3/2022 | Wang et al. | |
| 2022/0295116 A1 | 9/2022 | Ma et al. | |
| 2022/0303529 A1 | 9/2022 | Lai et al. | |

OTHER PUBLICATIONS

Bross B., et al., "Versatile Video Coding (Draft 9)," 130th MPEG Meeting, 18th JVET Meeting, Apr. 15, 2020-Apr. 24, 2020, Alpbach, (Motion Picture Expert Group or ISO/IEC JTC1/SC29/WG11 and JVET of ITU-T SG 16 WP 3 and ISO/IEC JTC 1/SC 29/WG 11), No. m53983, JVET-R2001-v8, May 6, 2020 (May 6, 2020), XP030287934, 524 pages.

Chen J., et al., "AHG11: In-Loop Filtering with Convolutional Neural Network and Large Activation", JVET-U0104-v2, Joint Video Experts Team (JVET) of ITU-T SG 16 WP 3 and ISO/IEC JTC 1/SC 29, 21th Meeting: by teleconference, Jan. 6-15, 2021, pp. 1-5.

Hsiao Y-L., et al., "AHG9: Convolutional Neural Network Loop Filter", JVET-M0159-v1, 13th Meeting: Joint Video Experts Team (JVET) of ITU-T SG 16 WP 3 and ISO/IEC JTC 1/SC 29/WG 11, No. JVET-M0159, Jan. 9, 2019 (Jan. 9, 2019), XP030201009, Retrieved from the Internet: URL: http://phenix.int-evry.fr/jvet/doc_end_user/documents/13_Marrakech/wg11/JVET-M0159-v2.zip JVET-M0159-v1.docx [Retrieved on Jan. 9, 2019], Marrakech, MA, Jan. 9-18, 2019, pp. 1-6.

International Preliminary Report on Patentability—PCT/US2021/052008—The International Bureau of WIPO—Geneva, Switzerland—Apr. 13, 2023, 10 Pages.

International Search Report and Written Opinion—PCT/US2021/052008—ISA/EPO—Feb. 1, 2022, 14 Pages.

Itu-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Li Y., et al., "AHG11: Convolutional Neural Network-Based In-Loop Filter with Adaptive Model Selection", JVET-U0068-v2, Joint Video Experts Team (JVET) of ITU-T SG 16 WP 3 and ISO/IEC JTC 1/SC 29, 21st Meeting, by Teleconference, Jan. 6-15, 2021, pp. 1-5.

Li Y., et al., "AHG11: Convolutional Neural Networks-based In-Loop Filter", JVET-T0088, Joint Video Experts Team (JVET) of ITU-T SG 16 WP 3 and ISO/IEC JTC 1/SC 29, 20th Meeting, by Teleconference, No. JVET-T0088, Oct. 1, 2020 (Oct. 1, 2020), XP030293537, Retrieved from the Internet: URL: https://jvet-experts.org/doc_end_user/documents/20_Teleconference/wg11/JVET-T0088-v1.zip JVET-T0088.docx [retrieved on Oct. 1, 2020], Oct. 7-16, 2020, pp. 1-4.

Li Y., et al., "CE10: Summary Report on Neural Network Based Filter for Video Coding", JVET-O0030-v4, Joint Video Experts Team (JVET) of ITU-T SG 16 WP 3 and ISO/IEC JTC 1/SC 29/WVG 11, 15th Meeting: Gothenburg, SE, Jul. 3-12, 2019, pp. 1-10.

Li Y., et al., "CE13: Summary Report on Neural Network Based Filter for Video Coding", JVET-N0033-v2, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-11.

Liu S., et al., "JVET Common Test Conditions and Evaluation Procedures for Neural Network-Based Video Coding Technology", JVET-T2006-v2, Joint Video Experts Team (JVET) of ITU-T SG 16 WP 3 and ISO/IEC JTC 1/SC 29/WG 11, 20th Meeting: by teleconference, Oct. 7-16, 2020, pp. 1-9.

Liu S., et al., "Methodology and Reporting Template for Neural Network Coding Tool Testing", JVET-T0041-v4, Joint Video Experts Team (JVET) of ITU-T SG 16 WP 3 and ISO/IEC JTC 1/SC 29, 20th Meeting: by teleconference, Oct. 7-16, 2020, 14 Pages.

Timofte R., et al., "DIV2K Dataset: DIVerse 2K Resolution High Quality Images as Used for the Challenges @ NTIRE (CVPR 2017 ( http://www.vision.ee.ethz.ch/ntire17) and CVPR 2018 ( http://www.vision.ee.ethz.ch/ntire18)) and @ Pirm (ECCV 2018 (https://www.pirm2018.org/))", 6 Pages, Retrieved from the Internet on Oct. 27, 2021, https://data.vision.ee.ethz.ch/cvl/DIV2K/.

Wang H., et al., "AHG11: Neural Network-Based In-Loop Filter", JVET-T0079-v3, Joint Video Experts Team (JVET) of ITU-T SG 16 WP 3 and ISO/IEC JTC 1/SC 29, 20th Meeting, by teleconference, Oct. 7-16, 2020, pp. 1-10.

Wang H., et al., "AHG11: Neural Network-Based In-Loop Filter Performance with No Deblocking Filtering Stage", JVET-U0115-v2, Joint Video Experts Team (JVET) of ITU-T SG 16 WP 3 and ISO/IEC JTC 1/SC 29, 21st Meeting, by teleconference, Jan. 6-15, 2021, pp. 1-5.

Wang H., et al., "EE: Tests on Neural Network-Based In-Loop Filter", JVET-U0094-v2, Joint Video Experts Team (JVET) of ITU-T SG 16 WP 3 and ISO/IEC JTC 1/SC 29, 21st Meeting, by teleconference, Jan. 6-15, 2021, pp. 1-9.

Woon-Sung P., et al., "CNN-Based in-Loop Filtering for Coding Efficiency Improvement", 2016 IEEE 12th Image, Video, and Multidimensional Signal Processing Workshop (IVMSP), IEEE, Jul. 11, 2016 (Jul. 11, 2016), pp. 1-5, XP032934608, DOI: 10.1109/IVMSPW.2016.7528223 [retrieved on Aug. 1, 2016], The whole document.

Zhang F., et al., "Bvi-Dvc: A Training Database for Deep Video Compression", University of Bristol, Apr. 1, 2020, https://doi.org/10.5523/bris.3hj4t64fkbrgn2ghwp9en4vhtn, 3 Pages.

Zhou (Hikvision) L., et al., "Convolutional Neural Network Filter (CNNF) for Intra Frame", 9. JVET Meeting, Jan. 20, 2018-Jan. 26, 2018, Gwangju, (The Joint Video Exploration Team of ISO/IEC JTC1/SC29/WG11 and ITU-TSG. 16), No. JVET-I0022, Jan. 24, 2018 (Jan. 24, 2018), pp. 1-9, XP030248070, The whole document.

Taiwan Search Report—TW110135570—TIPO—Feb. 8, 2025.

\* cited by examiner

MULTIPLE NEURAL NETWORK MODELS FOR FILTERING DURING VIDEO CODING

This application is a continuation of U.S. patent application Ser. No. 17/448,658, filed Sep. 23, 2021, which claims the benefit of U.S. Provisional Application No. 63/085,092, filed Sep. 29, 2020, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for filtering decoded (e.g., reconstructed) pictures, which may be distorted. The filtering process may be based on neural network techniques. The filtering process may be used in the context of advanced video codecs, such as extensions of ITU-T H.266/Versatile Video Coding (VVC), or subsequent generations of video coding standards, and any other video codecs. In particular, a video encoder may select a neural network model for a portion of a decoded picture to use to filter the portion of the decoded picture. For example, the video encoder may perform a rate distortion optimization (RDO) technique to determine the neural network model. Alternatively, the video encoder may determine a quantization parameter (QP) for the portion of the decoded picture and determine a neural network model to which the QP is mapped. The video encoder may signal the determined neural network model using the QP itself or a separate value for a syntax element representing an index into a set (or a subset of the set) of available neural network models.

In one example, a method of filtering decoded video data includes decoding a picture of video data; coding a value for a syntax element representing a neural network model to be used to filter a portion of the decoded picture, the value representing an index into a set of pre-defined neural network models, the index corresponding to the neural network model in the set of pre-defined neural network models; and filtering the portion of the decoded picture using the neural network model corresponding to the index.

In another example, a device for filtering decoded video data includes a memory configured to store video data; and one or more processors implemented in circuitry and configured to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

In another example, a computer-readable storage medium has stored thereon instructions that, when executed, cause a processor to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

In another example, a device for filtering decoded video data includes means for decoding a picture of video data; means for coding a value for a syntax element representing a neural network model to be used to filter a portion of the decoded picture, the value representing an index into a set of pre-defined neural network models, the index corresponding to the neural network model in the set of pre-defined neural network models; and means for filtering the portion of the decoded picture using the neural network model corresponding to the index.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), High Efficiency Video Coding (HEVC) or ITU-T H.265, including its range extension, multiview extension (MV-HEVC), and scalable extension (SHVC). Another example video coding standard is Versatile Video Coding (VVC) or ITU-T H.266, which has been developed by the Joint Video Expert TEAM (JVET) of ITU-T Video Coding Experts Group (VCEG) and ISO/IEC Motion Picture Experts Group (MPEG). Version 1 of the VVC specification, referred to as "VVC FDIS" hereinafter, is available from http://phenix.int-evry.fr/jvet/doc_end_user/documents/19_Teleconference/wg11/JVET-S2001-v17.zip.

The techniques of this disclosure are generally directed to filtering techniques using neural network-based filters. Typically, such filters are trained on large sets of data that provide good results for general video data, but may not be optimal for specific sequences of video data. By contrast, this disclosure describes multi-model neural network based filtering, which may yield better results for particular video sequences (e.g., in terms of bitrate and distortion).

Figure 1:
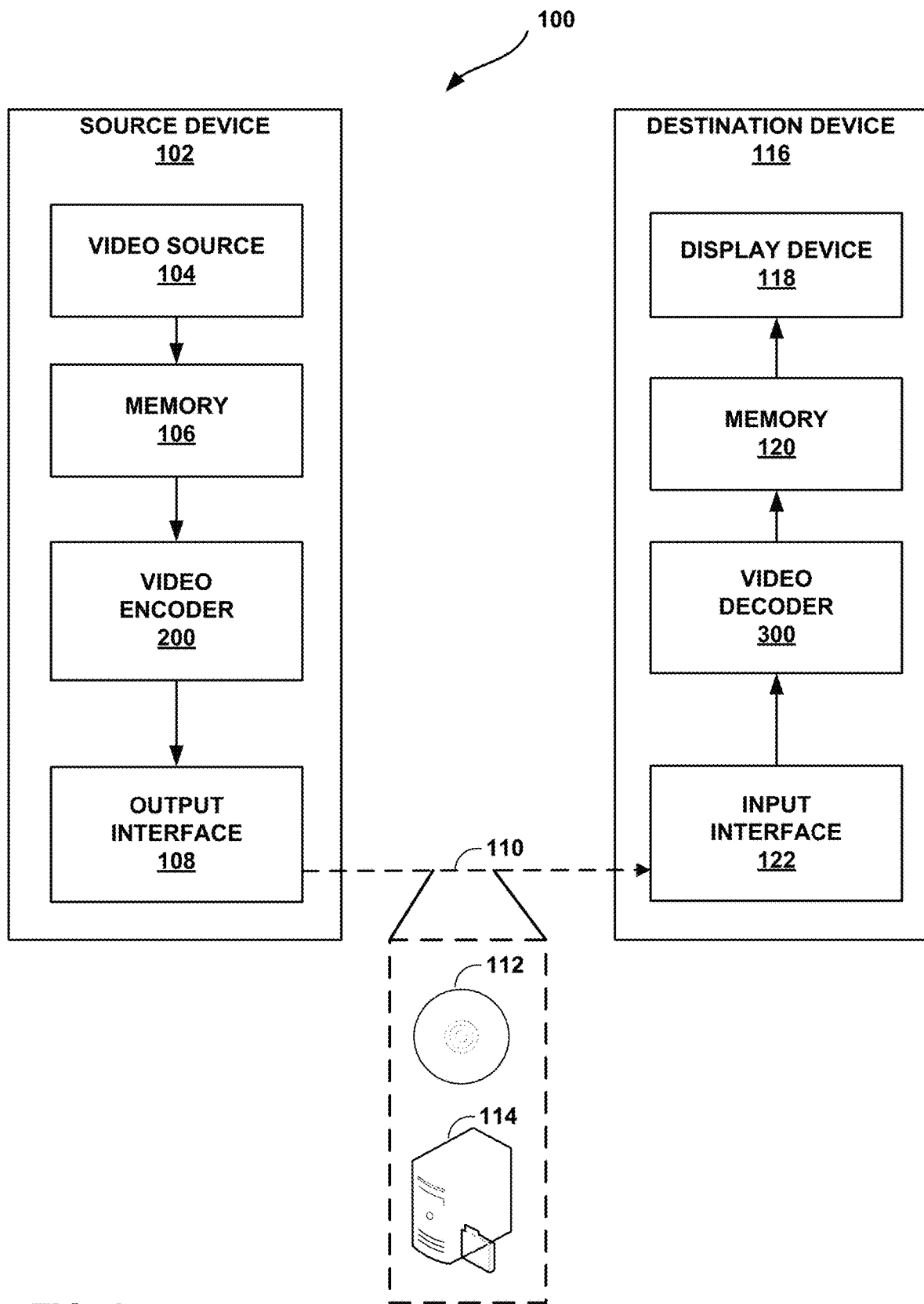
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for filtering using multiple neural network models. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for filtering using multiple neural network models. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (cMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: 15-24 April, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. The component may be an array or single sample from one of three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
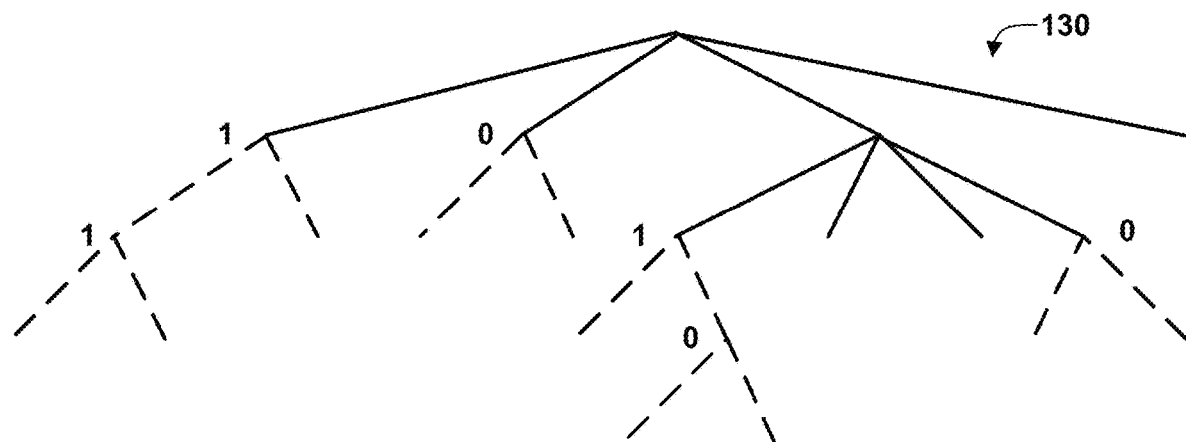
FIGS. 2A and 2B are conceptual diagrams illustrating an example quadtree binary tree (QTBT) structure, and a corresponding coding tree unit (CTU).
Figure 2B:
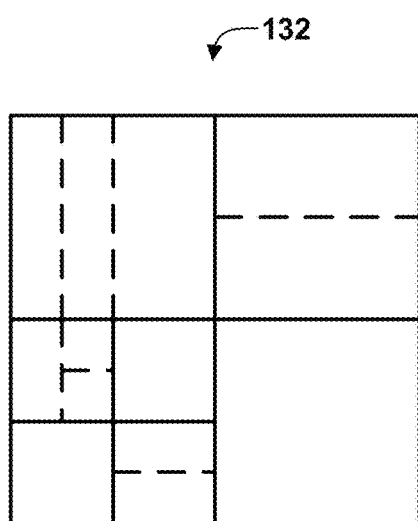

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, since the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) it implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
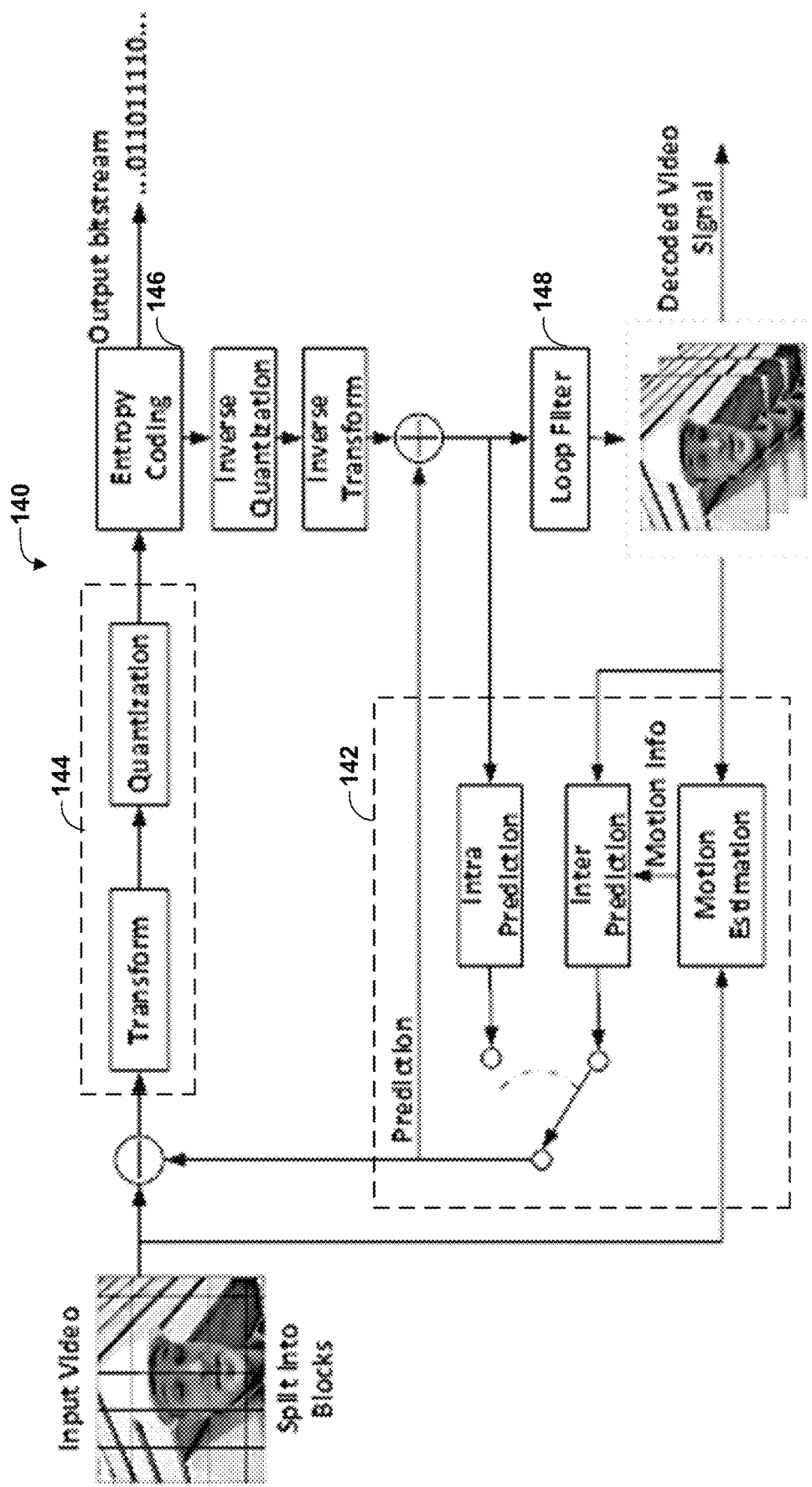
FIG. 3 is a conceptual diagram illustrating a hybrid video coding framework.

FIG. 3 is a conceptual diagram illustrating a hybrid video coding framework 140. Video coding standards since H.261 have been based on the so-called hybrid video coding principle, which is illustrated in FIG. 3. The term hybrid refers to the combination of two means to reduce redundancy in the video signal, i.e., prediction 142 and transform coding with quantization 144 of the prediction residual. Whereas prediction and transformation reduce redundancy in the video signal by decorrelation, quantization decreases the data of the transform coefficient representation by reducing their precision, ideally by removing only irrelevant details. This hybrid video coding design principle is also used in the two recent standards, ITU-T H.265/HEVC and ITU-T H.266/VVC. As shown in FIG. 3, a modern hybrid video coder includes block partitioning, prediction 142 including motion-compensated or inter-picture prediction and intra-picture prediction, transformation/quantization 144 including transformation and quantization, entropy coding 146, and post/in-loop filtering 148.

Block partitioning is used to divide the image into smaller blocks for operation of the prediction and transform processes. The early video coding standards used a fixed block size, typically 16×16 samples. Recent standards, such as HEVC and VVC, employ tree-based partitioning structures to provide flexible partitioning.

Motion-compensated or inter-picture prediction takes advantage of the redundancy that exists between (hence "inter") pictures of a video sequence. According to block-based motion compensation, which is used in all the modern video codecs, the prediction is obtained from one or more previously decoded pictures, i.e., the reference picture(s). The corresponding areas to generate the inter prediction are indicated by motion information, including motion vectors and reference picture indices.

Figure 4:
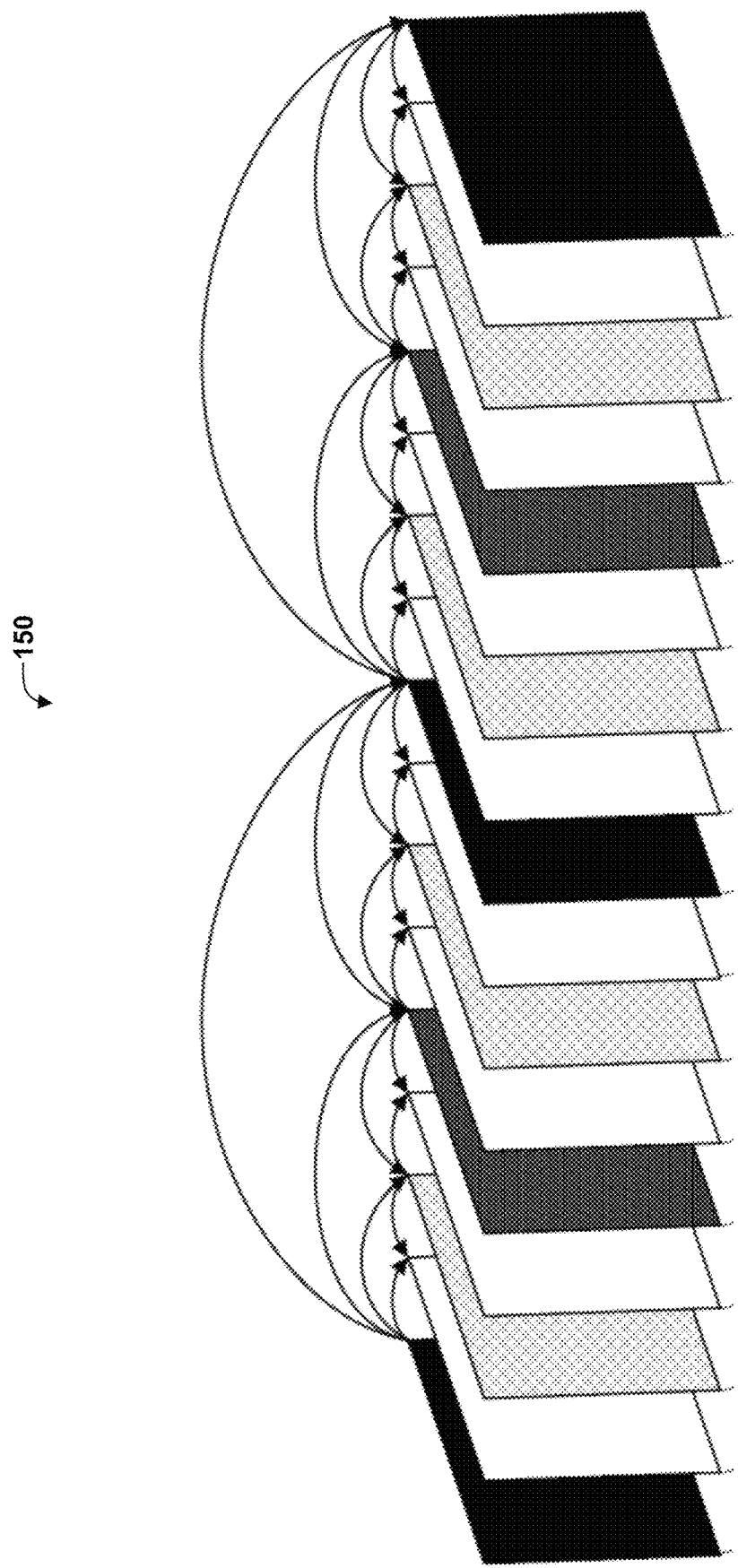
FIG. 4 is a conceptual diagram illustrating a hierarchical prediction structure using a group of pictures (GOP) size of 16.

FIG. 4 is a conceptual diagram illustrating a hierarchical prediction structure 150 using a group of pictures (GOP) size of 16. In recent video codecs, hierarchical prediction structures inside a group of pictures (GOP) is applied to improve coding efficiency.

Referring again to FIG. 3, intra-picture prediction exploits spatial redundancy that exists within a picture (hence "intra") by deriving the prediction for a block from already coded/decoded, spatially neighboring (reference) samples. The directional angular prediction, DC prediction and plane or planar prediction are used in the most recent video codec, including AVC, HEVC, and VVC.

Transformation: Hybrid video coding standards apply a block transform to the prediction residual (regardless of whether it comes from inter- or intra-picture prediction). In early standards, including H.261, H.262, and H.263, a discrete cosine transform (DCT) is employed. In HEVC and VVC, more transform kernel besides DCT are applied, in order to account for different statistics in the specific video signal.

Quantization aims to reduce the precision of an input value or a set of input values in order to decrease the amount of data needed to represent the values. In hybrid video coding, quantization is typically applied to individual transformed residual samples, i.e., to transform coefficients, resulting in integer coefficient levels. In recent video coding standards, the step size is derived from a so-called quantization parameter (QP) that controls the fidelity and bit rate. A larger step size lowers the bit rate but also deteriorates the quality, which e.g., results in video pictures exhibiting blocking artifacts and blurred details.

Context-adaptive binary arithmetic coding (CABAC) is a form of entropy coding used in recent video codecs, e.g., AVC, HEVC, and VVC, due to its high efficiency.

Post/In-Loop Filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. As shown in FIG. 3, the reconstructed pictures after in-loop filtering are stored and used as a reference for inter-picture prediction of subsequent pictures. The coding artifacts are mostly determined by the QP, therefore QP information is generally used in design of the filtering process. In HEVC, the in-loop filters include deblocking filtering and sample adaptive offset (SAO) filtering. In the VVC standard, an adaptive loop filter (ALF) was introduced as a third filter. The filtering process of ALF is as shown below:

$$R'(i, j) = R(i, j) + \left(\left(\sum_{k \neq 0}\sum_{l \neq 0} f(k, l) \times K(R(i+k, j+l) - R(i, j), c(k, l)) + 64\right) \gg 7\right)$$

where R(i, j) is the set of samples before the filtering process, R'(i, j) is a sample value after the filtering process. f(k, l) denotes filter coefficients, K(x, y) is a clipping function and c(k, l) denotes the clipping parameters. The variables k and l vary between −L/2 and L/2 where L denotes the filter length. The clipping function K (x, y)=min(y, max(−y, x)), which corresponds to the function Clip3 (−y, y, x). The clipping operation introduces non-linearity to make ALF more efficient by reducing the impact of neighbor sample values that are too different with the current sample value. In VVC, the filtering parameters can be signalled in the bit stream, it can be selected from the pre-defined filter sets. The ALF filtering process can also summarized as following equation:

$$R'(i, j) = R(i, j) + \text{ALF\_residual\_output}(R)$$

Figure 5:
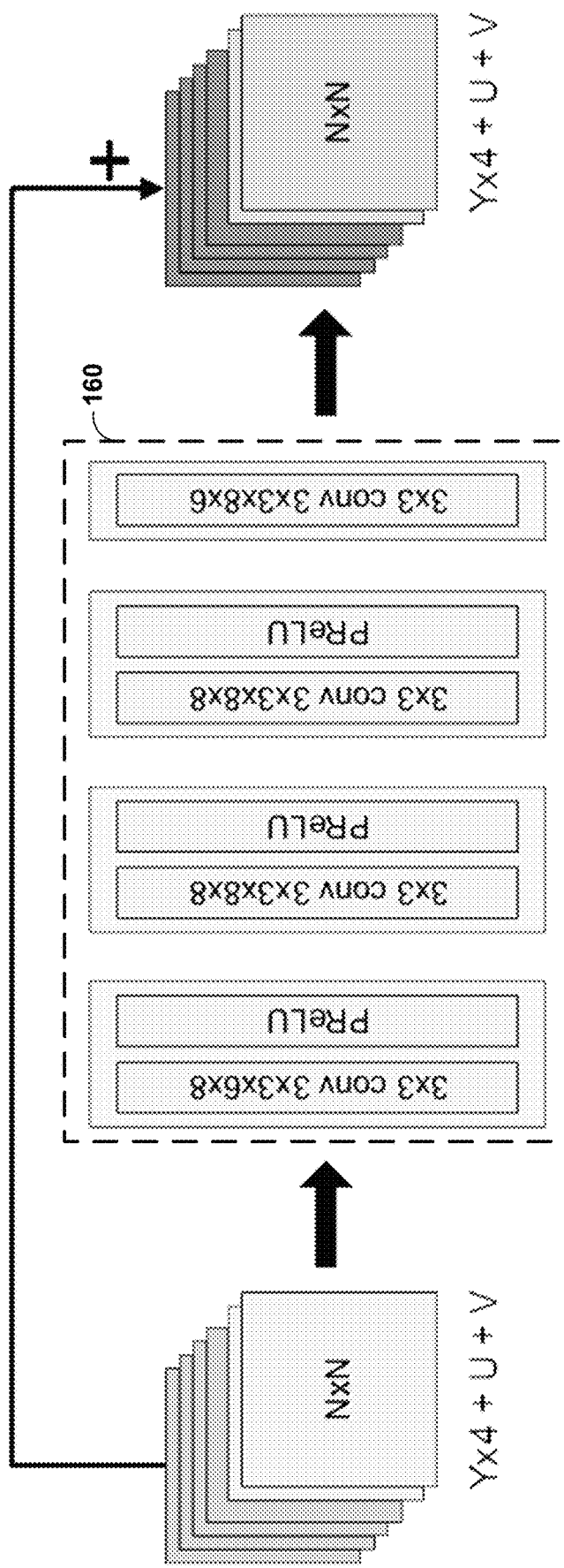
FIG. 5 is a conceptual diagram illustrating a neural network based filter with four layers.

FIG. 5 is a conceptual diagram illustrating a neural network based filter 160 with four layers. Various studies have shown that embedding neural networks (NN) into hybrid video coding framework can improve compression efficiency. Neural networks have been used in the module of intra prediction and inter prediction to improve prediction efficiency. NN-based in loop filtering is also a prominent research topic in recent years. In some cases, the NN-based filtering process is applied as post-loop filtering. In this case, the filtering process is only applied to the output picture and the un-filtered picture is used as a reference picture.

The NN-based filter can be applied in addition to the existing filters, such as deblocking filters, sample adaptive offset (SAO), and/or adaptive loop filtering (ALF). NN-based filters can also be applied exclusively, where NN-based filters are designed to replace all of the existing filters. Additionally or alternatively, NN-based filters may be designed to supplement, enhance, or replace any or all of the other filters.

As shown in FIG. 5, the NN-based filtering process may take the reconstructed samples as inputs, and the intermediate outputs are residual samples, which are added back to the input to refine the input samples. The NN filter may use all color components (e.g., Y, U, and V, or Y, Cb, and Cr, i.e., luminance, blue-hue chrominance, and red-hue chrominance) as input to exploit cross-component correlations. Different color components may share the same filters (including network structure and model parameters) or each color component may have its own specific filters.

The filtering process can also be generalized as follows: R'(i, j)=R(i, j)+NN_filter_residual_ouput(R). The model structure and model parameters of NN-based filter(s) can be pre-defined and be stored at encoder and decoder. The filters can also be signalled in the bit stream.

This disclosure recognizes that in some cases, pre-defined filters (e.g., NN-based filters or ALF) are trained based on a large set of video and image data base. The filters could be optimal in general, but may be non-optimal for a specific distorted sequence. This disclosure also recognizes that, since the pre-defined training image/video database may not constitute all the possible types of video characteristics, applying a filter trained on this given database to a sequence with different video characteristic may not bring any objective or subjective benefit, but instead may hurt the objective or subjective quality.

Video encoder 200 and video decoder 300 of FIG. 1 may be configured, according to the techniques of this disclosure, to perform any or all of the following techniques, alone or in any combination. In general, multiple filtering models may be used. For each target area of input pictures, video encoder 200 and/or video decoder 300 may select one or more of the multiple filtering models to perform filtering. Video encoder 200 and video decoder 300 may implicitly derive the selection of NN models based on information in bitstreams (e.g., based on quantization parameter (QP)). Alternatively, video decoder 300 may derive the selection of NN models using indices explicitly signaled by video encoder 200 in a bitstream. In some examples, explicit signaling and implicit derivation can be combined.

In some examples, video encoder 200 may select one or more models and signal indices for the selected models in the bitstream. When one model is selected, the model is used to filter the corresponding target area of the input picture. When multiple models are selected, the models are used jointly to filter the target area of the input picture. As an example, video encoder 200 and video decoder 300 may apply the models to the target area separately and the output of the involved models may be combined as the final output of the target area.

Switching off the filtering process can be used as a candidate. When 'switching off' is selected for a target area, video encoder 200 and video decoder 300 do not apply any filter and the output signal is the same as the input signal.

The granularity of selecting and signaling the model(s) can be designed at different levels. The possible levels at which the filter model index is signaled include video parameter set/sequence parameter set/picture parameter set (VPS/SPS/PPS) level, intra period level, group of pictures (GOP) level, temporal layer level in the GOP, picture level, slice level, CTU level, or a grid size N*N designed specifically for filter signaling. The selection of the level used for filter model signaling can be fixed; video encoder 200 may signal the selection to video decoder 300 as a syntax element in bitstreams; or video decoder 300 may implicitly derive the selection based on information in the bitstream (e.g., picture resolution, QP, etc.)

In one example implementation, there are N pre-defined filter models. At the level of filter model signaling, video encoder 200 selects one model and signals the corresponding index for video decoder 300 to determine which filter model is to be used. The possible levels of signaling the element include VPS/SPS/PPS level, intra period level, group of pictures (GOP) level, picture level, slice level, CTU level or a grid size N*N designed specifically for filter signaling. The selection of the level used for filter model signaling can be fixed, signaled as an syntax element in bitstreams, or implicitly derived based on information in bitstreams (e.g., picture resolution, QP, etc.)

As another example, video encoder 200 may derive a subset of the pre-defined models and signal this subset in the bitstream as a syntax element in Sequence parameter set (SPS), Slice header, picture header, adaptive parameter set (APS), or any other high level syntax element body to video decoder 300. The size of the subset is referred to here as M. M can be any value that is pre-defined or signaled in bitstreams at a lower level (e.g., slice header, picture header, CTU level, grid level, etc.) If M>1, one of the M candidates is selected and signaled in the bitstream as a syntax element.

As another example, each of the filter models may be associated with a QP value, and for each picture, video encoder 200 and video decoder 300 may derive a 'model selection QP' and select the models with the QP value that is closest to the 'model selection QP' for the current picture. In this case, no additional information needs to be signaled. The information used to derive the 'model selection QP' may include: current picture QP(s), reference picture QP(s), QP(s) of pictures within the same GOP, QP(s) of pictures within the same intra period, etc. Alternatively, QPs for one or more blocks in the slice, or block level QPs, may be provided to the NN model to filter the current slice or the current block.

As another example, similar to the above example, each filter model may be associated with a QP value, and video encoder 200 and video decoder 300 may derive a 'model selection QP' for each frame. Video encoder 200 and video decoder 300 may derive a subset of all the models based on the 'model selection QP.' Video encoder 200 may determine the models with model QPs that are nearest to the 'model selection QP', select one of these models, and signal an additional index for video decoder 300 to select the model from the QP-derived subset.

As noted above, switching off NN based modeling can be used as a candidate of choice, in any or all of the various examples discussed above. Switching off can be considered as an additional regular candidate of the filter model set, and the signaling of the 'switching off' case may be unified with the signaling of other filter models. As another example, 'switching off' may be considered as a special candidate and the signaling is separated from other filter models.

Video encoder 200 and video decoder 300 may be configured to apply an on/off control for multi-model based filtering as discussed above. That is, video encoder 200 and video decoder 300 would filter the residual and add the result to the input samples only when a given control operation (e.g., a flag) asserts that the filtering should be applied. This control signal can be expressed as:

If (ApplyFilter is True) { $R'(i, j) = R(i, j) + (\text{filter\_residual\_output}(R)))$}, $$\text{else } \{R'^{(i,j)} = R(i, j)\}$$

where ApplyFilter is a control operation that may be determined by video encoder 200, which may signal data representative of the decision (e.g., a flag or other syntax element) in the bitstream to video decoder 300.

As an example, video encoder 200 may compute the Rate-Distortion (RD) cost of applying the filter and compare it with the RD-Cost of not applying the filter. Based on the result of this comparison, video encoder 200 may determine the control operation (e.g., set the value of a given flag to either a 0 or a 1 state, where one state represents the filter to be applied and the other state represents not to apply the filter). Video encoder 200 may then signal the given flag in the bitstream. Video decoder 300 may parse the given flag and based on its value, either apply the filter or not. Since the trained filter may not be optimal for the whole video sequence, or for a given frame in the sequence or a given region in the sequence, the granularity at which the control operation (flag) is signalled also becomes important.

In some examples, video encoder 200 may derive the value of the filter On/Off and signal the value in the bit stream as a syntax element in a sequence parameter set (SPS), slice header, picture parameter set (PPS), picture header, adaptive parameter set (APS), or any other high level syntax element body. Video decoder 300 may determine whether or not to use the filter using the value of this syntax element.

In some examples, video encoder 200 may derive the value of the filter On/Off flag and signal the value in the bit stream as a syntax element at block level, e.g., at CTU level. Video decoder 300 may determine whether or not to use the filter using the value of this syntax element.

In some examples, video encoder 200 may determine the grid size (for signalling) and the value of filter on/off flag at the corresponding grid and signal the values for each of the grids in the bit stream as respective syntax elements. Video decoder 300 may determine whether or not to use the filters for each of the elements of the grid, and the grid itself, using the values of these syntax elements.

Instead of using a fixed Grid Size for signaling (e.g., where Grid Size is always fixed as a CTU size), video encoder 200 may selectively choose a different grid size for a given slice based on the RD-cost. For example, for a given slice, video encoder 200 may apply different grid sizes (e.g., sizes of M×N where M and N can take the values in the range [4, 8, 16, . . . , Frame Size]). Video encoder 200 may calculate the corresponding RD-cost for both Filter on and off cases. Based on the best RD-cost, video encoder 200 may select the grid size and the corresponding filter on/off flags and signal data representing the grid size and the filter on/off flags in the bitstream. The Grid sizes can be pre-defined at both video encoder 200 and video decoder 300, e.g., as shown in Table 1 below:

TABLE 1

| Index | Grid Size for signalling (M × N) |
|---|---|
| 0 | 8 × 8 |
| 1 | 16 × 16 |
| 2 | 32 × 32 |
| 3 | 64 × 64 |
| 4 | 128 × 128 |
| And so on . . . | |

Video encoder 200 may signal the index value of the grid in the bitstream using unary code, binary, truncated binary, or variable length code.

Video decoder 300 may determine the grid size for signaling based on the resolution of the input sequence. For example, for a lower resolution sequence, a finer granularity grid is employed (say 8×8), whereas for a higher resolution sequence, a coarser granularity grid (say 128×128) is used.

In some examples, video encoder 200 may determine the filter On/Off flag separately for each color component. Therefore, Luma (Y), Chroma (Cb), and Chroma (Cr) have their own individual control flags.

In some examples, the filter On/Off flag is only signalled for a single component. The other components may share the same flags. For example, video encoder 200 may signal the control flag only for the Luma component, and then the Cb and Cr component may share the same flags. In other examples, video encoder 200 may signal a control flag for a luma component and a joint flag for the chroma components.

Video encoder 200 and video decoder 300 may apply separate CABAC contexts for signalling the flags for separate components (e.g., Y, Cb, and Cr may have separate contexts). Also, video encoder 200 and video decoder 300 may use spatial/temporal neighboring block flag On/Off information to determine the context used to signal the flag for the current block. The neighboring blocks may be above and/or to the left of the current block, directly or within a certain number of blocks.

The distortion measure used to compute the RD-cost for determining the On/Off flags can be SAD (sum of absolute differences), or SATD (sum of absolute transform differences), or any other distortion measures.

Figure 6:
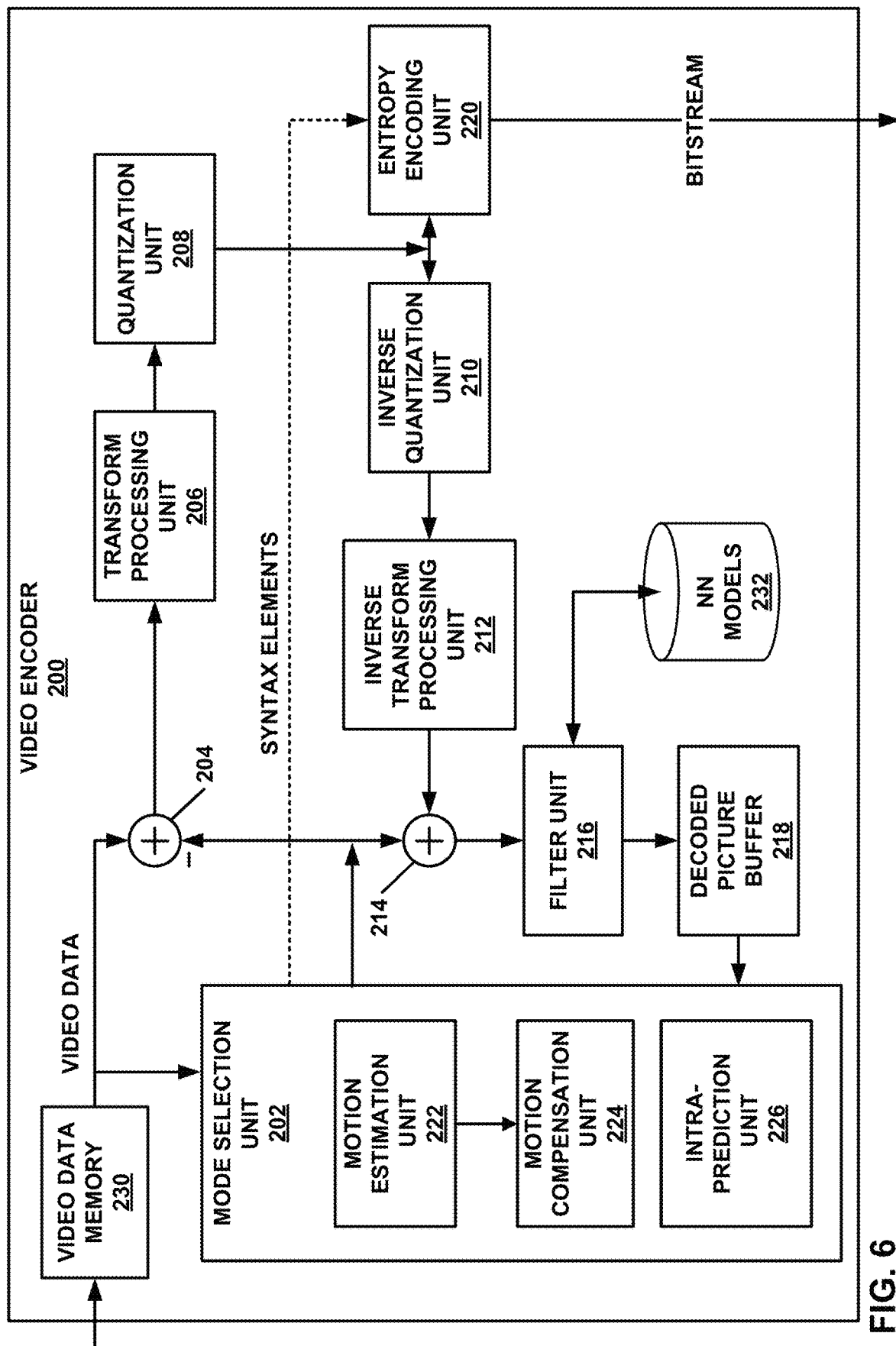
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the ITU-T H.265/HEVC video coding standard and the VVC video coding standard in development. However, the techniques of this disclosure are not limited to these video coding standards and are applicable generally to other video encoding and decoding standards.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes motion estimation unit 222, motion compensation unit 224, and intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2NxnU, 2NxnD, nLx2N, and nRx2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead may generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may be configured to perform the various techniques of this disclosure, e.g., to determine one or more of neural network models (NN models) 232 to be used to filter a decoded picture and/or whether to apply NN model filtering. Mode selection unit 202 may perform RD calculations using both filtered and unfiltered pictures to determine RD costs to determine whether to perform NN model filtering, and then provide data to entropy encoding unit 220 representing, e.g., whether or not to perform NN model filtering, one or more of NN models 232 to use for a current picture or a portion thereof, or the like.

In particular, according to techniques of this disclosure, filter unit 216 may determine that NN models 232 include a set of available NN models that may be applied to a portion of a decoded picture. In some examples, filter unit 216 may determine that only a subset of NN models 232 is available for the portion of the decoded picture (where the subset includes fewer NN models than the full set of NN models 232). In such examples, filter unit 216 may provide data to entropy encoding unit 220 defining the subset of NN models 232 available for the portion of the decoded picture. Entropy encoding unit 220 may signal data indicating the subset, e.g., in an SPS, a PPS, an APS, a slice header, a picture header, or other high level syntax element.

In some examples, filter unit 216 may select one of NN models 232 for a portion of a decoded picture. To select one of NN models 232, filter unit 216 may determine a quantization parameter for the portion of the decoded picture. Alternatively, mode selection unit 202 may perform a rate-distortion optimization (RDO) process to determine which of NN models 232 yields a best RDO performance, and select the one of NN models 232 that yields the best RDO performance. Mode selection unit 202 may then provide a value representing an index into the set (or subset) of available NN models 232 corresponding to the determined NN model that yields the best RDO performance.

In some examples, mode selection unit 202 may further determine whether to enable or disable the use of NN models 232 for, e.g., a particular region of a decoded picture, an entire decoded picture, a sequence of decoded pictures, or the like. Mode selection unit 202 may provide data indicating whether the use of NN models 232 is enabled or disabled to entropy encoding unit 220. Entropy encoding unit 220 may further encode data representing whether the use NN models 232 is enabled or disabled, e.g., in one or more of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

The portion of the decoded video data may, in some examples, be an element of a grid. That is, video encoder 200 may partition the decoded picture into a grid of a number of elements, e.g., elements in rows and columns of the decoded picture formed by the grid. Entropy encoding unit 220 may further encode data representing the grid, e.g., values for syntax elements representing a number of rows and columns and/or a number of elements for the grid.

Video encoder 200 stores reconstructed (and in some cases, filtered) blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 of FIG. 6 represents an example of a device for filtering decoded video data including a memory configured to store video data; and one or more processors implemented in circuitry and configured to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

Figure 7:
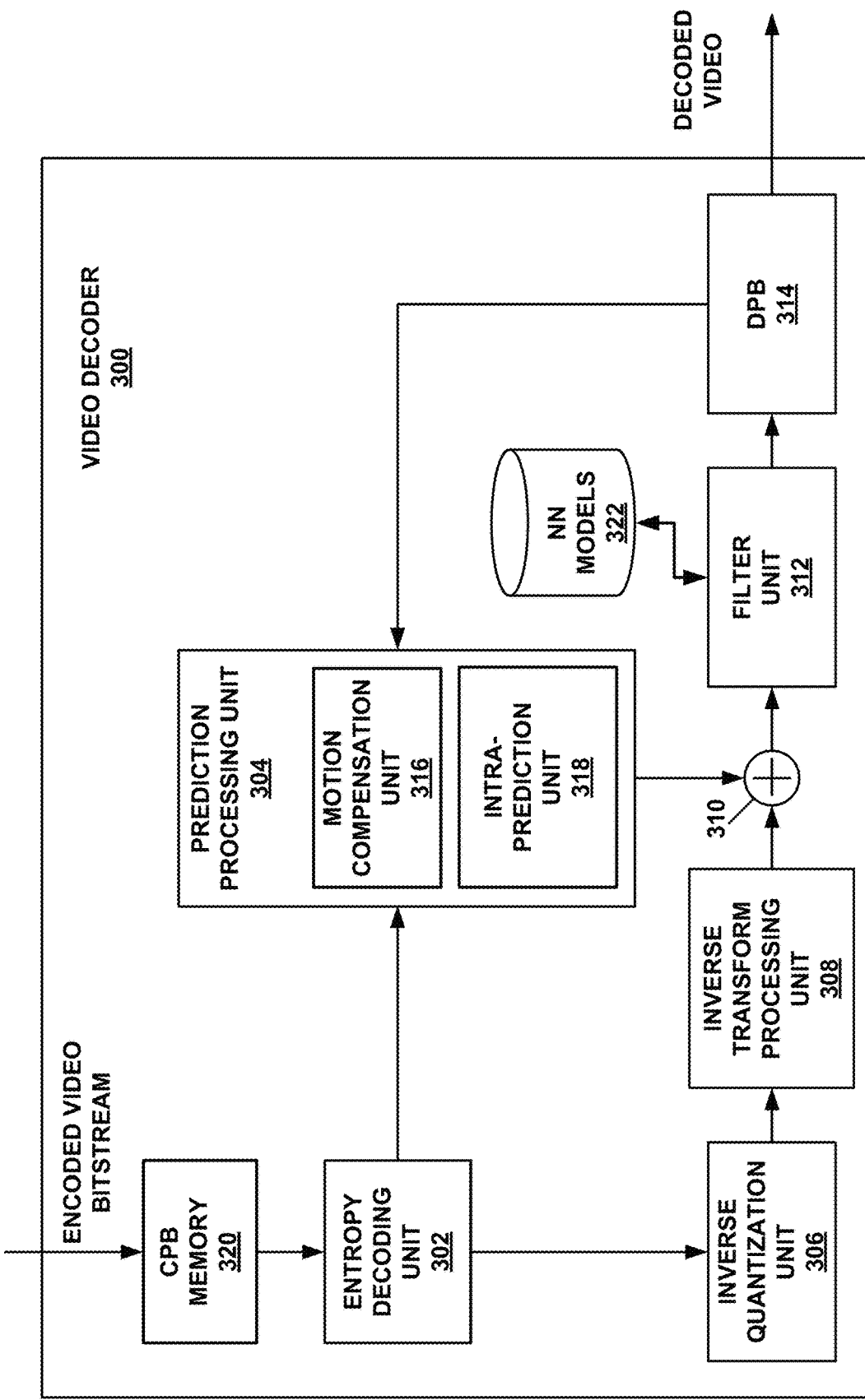
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. For example, video decoder 300 may explicitly or implicitly determine whether to perform neural network model filtering using NN models 322, e.g., using any or all of the various techniques discussed herein. Moreover, video decoder 300 may explicitly or implicitly determine one or more of NN models 322 and/or a grid size for a current picture to be decoded and filtered. Accordingly, filter unit 312, when filtering is switched on, may use one or more of NN models 322 to filter a portion of a current decoded picture.

Filter unit 312 may perform one or more filter operations on reconstructed blocks. For example, filter unit 312 may perform deblocking operations to reduce blockiness artifacts along edges of CUs/TUs. Operations of filter unit 312 may be skipped, in some examples. Filter unit 312 may be configured to perform the various techniques of this disclosure, e.g., to determine one or more of neural network models (NN models) 232 to be used to filter a decoded picture and/or whether to apply NN model filtering. Mode selection unit 202 may perform RD calculations using both filtered and unfiltered pictures to determine RD costs to determine whether to perform NN model filtering, and then provide data to entropy encoding unit 220 representing, e.g., whether or not to perform NN model filtering, one or more of NN models 322 to use for a current picture or a portion thereof, or the like.

In particular, according to techniques of this disclosure, filter unit 312 may determine that NN models 322 include a set of available NN models that may be applied to a portion of a decoded picture. In some examples, filter unit 312 may determine that only a subset of NN models 322 is available for the portion of the decoded picture (where the subset includes fewer NN models than the full set of NN models 322). In such examples, filter unit 312 may receive decoded data from entropy decoding unit 302 defining the subset of NN models 322 available for the portion of the decoded picture. Entropy decoding unit 302 may decode data indicating the subset, e.g., in an SPS, a PPS, an APS, a slice header, a picture header, or other high level syntax element.

In some examples, filter unit 312 may select one of NN models 322 for a portion of a decoded picture. To select one of NN models 322, filter unit 312 may determine a quantization parameter (QP) for the portion of the decoded picture and determine one of NN models 322 corresponding to the QP. Alternatively, filter unit 312 may receive a value representing an index into the set (or subset) of available NN models 322 corresponding to the determined NN model to be used.

In some examples, filter unit 312 may further determine whether to enable or disable the use of NN models 322 for, e.g., a particular region of a decoded picture, an entire decoded picture, a sequence of decoded pictures, or the like. Filter unit 312 may receive data indicating whether the use of NN models 322 is enabled or disabled from entropy decoding unit 302. Entropy decoding unit 302 may decode the data representing whether the use NN models 322 is enabled or disabled, e.g., in one or more of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

The portion of the decoded video data may, in some examples, be an element of a grid. That is, video decoder 300 may partition the decoded picture into a grid of a number of elements, e.g., elements in rows and columns of the decoded picture formed by the grid. Entropy decoding unit 302 may decode data representing the grid, e.g., values for syntax elements representing a number of rows and columns and/or a number of elements for the grid.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304.

Moreover, video decoder 300 may output decoded pictures from DPB 314 for subsequent presentation on a display device, such as display device 118 of FIG. 1.

In this manner, video decoder 300 of FIG. 7 represents an example of a device for filtering decoded video data including a memory configured to store video data; and one or more processors implemented in circuitry and configured to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

Figure 8:
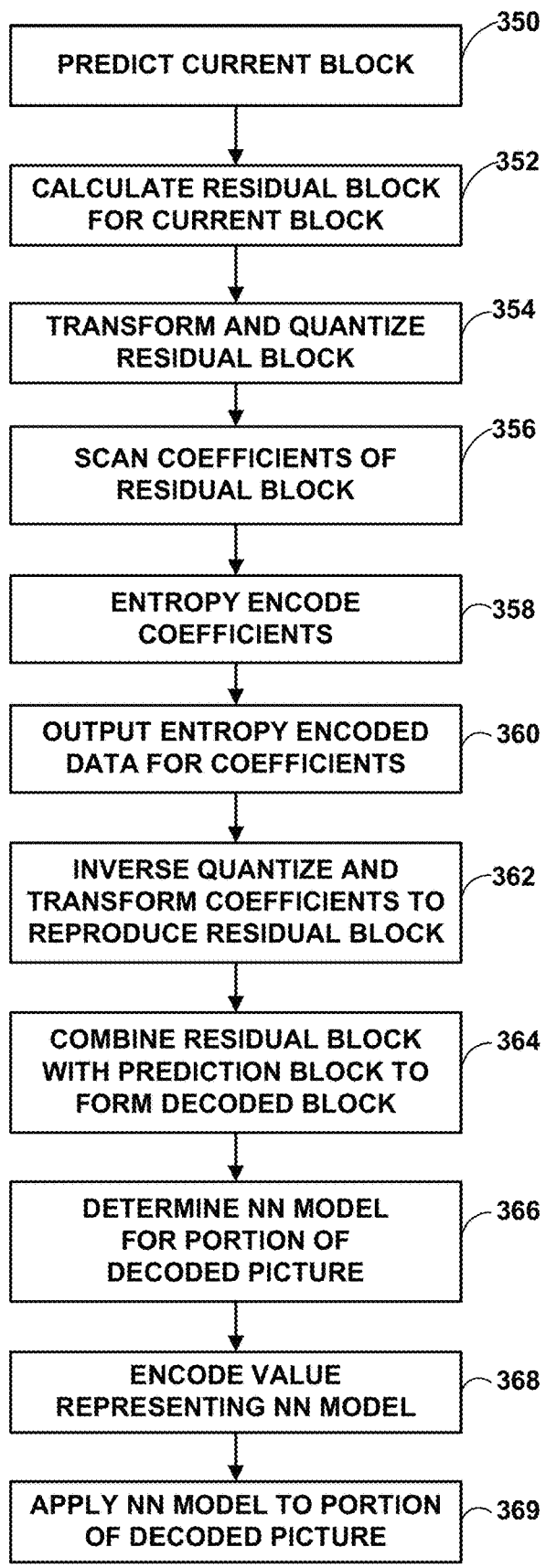
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364).

According to the techniques of this disclosure, after encoding and decoding all blocks of the picture in the manner described above, video encoder 200 may determine a neural network (NN) model for a portion of a decoded picture including the current block to be applied to the portion of the decoded picture (366). In one example, video encoder 200 may determine a quantization parameter (QP) for the portion of the decoded picture and determine a NN model corresponding to the QP. In another example, video encoder 200 may perform a rate-distortion optimization (RDO) procedure to select the NN model, e.g., from a set of available NN models. That is, video encoder 200 may apply various NN models to the portion of the decoded picture, then calculate RDO values for each of the various NN models and select the NN model for the portion of the decoded picture that yields the best tested RDO value.

Video encoder 200 may then encode a value representing the NN model (368). When video encoder 200 selects the NN model based on the QP, video encoder 200 may simply encode the QP to represent the NN model. That is, the QP as encoded for a block (e.g., as part of TU information) may be provided to the NN model to select an appropriate NN-based filter. Alternatively, when video encoder 200 selects the NN model from a set (or a subset of the set) of available NN models, video encoder 200 may encode a value of a syntax element representing an index into the set (or the subset) where the index corresponds to the position of the NN model in the set or subset. The syntax element may form part of a video parameter set (VPS), a sequence parameter set (SPS), a picture parameter set (PPS), an adaptive parameter set (APS), an intra period level, a group of pictures (GOP) level, a temporal layer level in a GOP, a picture level, a slice level, a coding tree unit (CTU) level, or a grid level for a grid of the picture. Video encoder 200 may then apply the determined NN model to the portion of the decoded picture (369) to filter the portion of the decoded picture and store the decoded picture in DPB 218.

In some examples, rather than determining a single NN model, video encoder 200 may determine multiple NN models for the portion of the decoded picture. Video encoder 200 may separately apply each of the NN models to the portion of the decoded picture to form distinct filtering results. Video encoder 200 may then combine each of the filtering results to form a final filtered portion of the decoded picture.

The portion of the decoded picture may correspond to an element of a grid. That is, video encoder 200 may partition the decoded picture into a grid having a number of elements (e.g., areas formed by respective numbers of rows and columns). Video encoder 200 may signal data representing the grid, such as a number of rows and a number of columns or a number of elements of the grid, in at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level. In some examples, video encoder 200 may signal a value for a syntax element representing an index into a set of possible grid sizes.

In this manner, the method of FIG. 8 represents an example of a method for filtering decoded video data including decoding a picture of video data; coding a value for a syntax element representing a neural network model to be used to filter a portion of the decoded picture, the value representing an index into a set of pre-defined neural network models, the index corresponding to the neural network model in the set of pre-defined neural network models; and filtering the portion of the decoded picture using the neural network model corresponding to the index.

Figure 9:
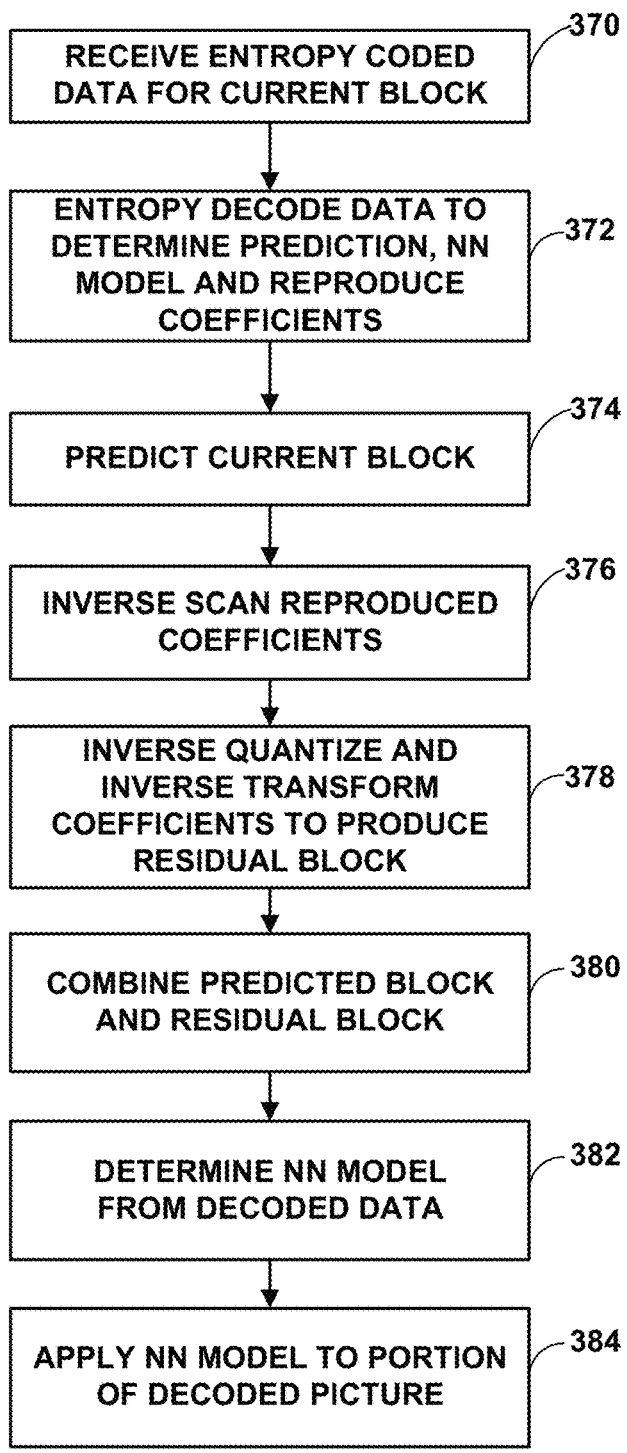
FIG. 9 is a flowchart illustrating an example method for decoding a current block in accordance with the techniques of this disclosure.

FIG. 9 is a flowchart illustrating an example method for decoding a current block in accordance with the techniques of this disclosure. The current block may comprise a current CU. Although described with respect to video decoder 300 (FIGS. 1 and 4), it should be understood that other devices may be configured to perform a method similar to that of FIG. 9.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block, a neural network (NN) model for a portion of the picture including the current block, and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the quantized transform coefficients to produce a residual block (378). Video decoder 300 may ultimately decode the current block by combining the prediction block and the residual block (380).

Video decoder 300 may also determine a NN model from the decoded data (382) to be applied to a portion of the decoded picture including the current block. For example, video decoder 300 may decode a quantization parameter (QP) for the portion of the decoded picture (e.g., for one or more blocks in the portion) and determine the NN model to which the QP corresponds. As another example, video decoder 300 may decode a value for a syntax element representing an index into a set (or a subset of the set) of available NN models, and determine the NN model of the set or subset of the available NN models to which the index corresponds. Video decoder 300 may then apply the NN model to the portion of the decoded picture (384) to filter the portion of the decoded picture. In one example, in which the filter is an in-loop filter, video decoder 300 stores the decoded picture, including the filtered portion, to decoded picture buffer 314.

In this manner, the method of FIG. 9 represents an example of a method for filtering decoded video data including decoding a picture of video data; coding a value for a syntax element representing a neural network model to be used to filter a portion of the decoded picture, the value representing an index into a set of pre-defined neural network models, the index corresponding to the neural network model in the set of pre-defined neural network models; and filtering the portion of the decoded picture using the neural network model corresponding to the index.

The following clauses summarize various techniques of this disclosure:

Clause 1: A method of filtering decoded video data, the method comprising: determining one or more neural network models to be used to filter a portion of a decoded picture of video data; and filtering the portion of the decoded picture using the one or more neural network models.

Clause 2: The method of clause 1, wherein determining the one or more neural network models comprises determining no more than a single neural network model.

Clause 3: The method of clause 1, wherein determining the one or more neural network models comprises determining a plurality of neural network models.

Clause 4: The method of clause 3, wherein filtering comprises: separately applying each of the plurality of neural network models to the portion to form distinct results; and combining each of the results to form a final filtered portion.

Clause 5: The method of any of clauses 1-4, wherein determining comprises determining using an index signaled in a bitstream including the video data.

Clause 6: The method of any of clauses 1-5, wherein the portion comprises an element of a grid.

Clause 7: The method of any of clauses 1-6, further comprising determining a number of elements of the grid.

Clause 8: The method of clause 7, wherein determining the number of elements of the grid comprises decoding a syntax element of at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 9: The method of any of clauses 7 and 8, wherein determining the number of elements in the grid comprises decoding a value of a syntax element representing an index into a set of possible grid sizes.

Clause 10: The method of any of clauses 1-9, further comprising determining to apply the one or more neural network models prior to determining the one or more neural network models.

Clause 11: The method of clause 10, wherein determining to apply the one or more neural network models comprises decoding a syntax element having a value indicating that the one or more neural network models are to be applied.

Clause 12: The method of clause 11, wherein the syntax element is of at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 13: The method of any of clauses 1-12, wherein the portion comprises a portion of a color component of the decoded picture, the color component comprising one of a luminance component, a blue hue chrominance component, or a red hue chrominance components.

Clause 14: The method of clause 13, further comprising decoding a syntax element that jointly represents filtering using the one or more neural network models for each of the color components of the decoded picture.

Clause 15: The method of any of clauses 1-14, further comprising: encoding a current picture; and decoding the current picture to form the current picture.

Clause 16: The method of clause 15, wherein determining comprises determining according to a rate-distortion computation.

Clause 17: A device for decoding video data, the device comprising one or more means for performing the method of any of clauses 1-16.

Clause 18: The device of clause 17, wherein the one or more means comprise one or more processors implemented in circuitry.

Clause 19: The device of clause 17, further comprising a display configured to display the decoded video data.

Clause 20: The device of clause 17, wherein the device comprises one or more of a camera, a computer, a mobile device, a broadcast receiver device, or a set-top box.

Clause 21: The device of clause 17, further comprising a memory configured to store the video data.

Clause 22: A computer-readable storage medium having stored thereon instructions that, when executed, cause a processor to perform the method of any of clauses 1-16.

Clause 23: A method of filtering decoded video data, the method comprising: decoding a picture of video data; coding a value for a syntax element representing a neural network model to be used to filter a portion of the decoded picture, the value representing an index into a set of pre-defined neural network models, the index corresponding to the neural network model in the set of pre-defined neural network models; and filtering the portion of the decoded picture using the neural network model corresponding to the index.

Clause 24: The method of clause 23, further comprising coding a value representing a subset of the set of pre-defined neural network models, the neural network model being one of the subset of the set of pre-defined neural network models, the subset being smaller than the set of pre-defined neural network models.

Clause 25: The method of clause 23, wherein the value for the syntax element representing the neural network model is a value representing a plurality of neural network models.

Clause 26: The method of clause 25, wherein filtering comprises: separately applying each of the plurality of neural network models represented by the value to the portion to form distinct results; and combining each of the results to form a final filtered portion.

Clause 27: The method of clause 23, wherein coding the value for the syntax element comprises coding the value for the syntax element in one of a video parameter set (VPS), a sequence parameter set (SPS), a picture parameter set (PPS), an adaptive parameter set (APS), an intra period level, a group of pictures (GOP) level, a temporal layer level in a GOP, a picture level, a slice level, a coding tree unit (CTU) level, or a grid level for a grid of the picture.

Clause 28: The method of clause 23, further comprising partitioning the picture according to a grid, wherein the portion comprises an element of the grid of the picture.

Clause 29: The method of clause 28, further comprising determining a number of elements of the grid.

Clause 30: The method of clause 29, wherein determining the number of elements of the grid comprises decoding a syntax element of at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 31: The method of clause 29, wherein determining the number of elements in the grid comprises decoding a value of a syntax element representing an index into a set of possible grid sizes.

Clause 32: The method of clause 23, further comprising determining to apply the neural network model prior to determining the neural network model.

Clause 33: The method of clause 32, wherein determining to apply the neural network model comprises decoding a value for a syntax element indicating that the neural network model is to be applied.

Clause 34: The method of clause 33, wherein the syntax element is of at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 35: The method of clause 23, wherein the portion of the decoded picture comprises a portion of a color component of the decoded picture, the color component comprising one of a luminance component, a blue hue chrominance component, or a red hue chrominance components.

Clause 36: The method of clause 35, further comprising coding a syntax element that jointly represents filtering using the neural network model for each of the color components of the decoded picture.

Clause 37: The method of clause 23, wherein the value for the syntax element comprises a quantization parameter (QP) for the portion of the picture.

Clause 38: The method of clause 23, further comprising encoding the picture prior to decoding the picture, wherein coding the value for the syntax element comprises encoding the value for the syntax element.

Clause 39: The method of clause 38, further comprising determining the neural network model according to a rate-distortion computation.

Clause 40: A device for filtering decoded video data, the device comprising: a memory configured to store video data; and one or more processors implemented in circuitry and configured to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

Clause 41: The device of clause 40, wherein the one or more processors are further configured to code a value representing a subset of the set of pre-defined neural network models, the neural network model being one of the subset of the set of pre-defined neural network models, the subset being smaller than the set of pre-defined neural network models.

Clause 42: The device of clause 40, wherein the value for the syntax element representing the neural network model is a value representing a plurality of neural network models, and wherein to filter the portion of the decoded picture, the one or more processors are configured to: separately apply each of the plurality of neural network models represented by the value to the portion to form distinct results; and combine each of the results to form a final filtered portion.

Clause 43: The device of clause 40, wherein the one or more processors are configured to code the value for the syntax element in one of a video parameter set (VPS), a sequence parameter set (SPS), a picture parameter set (PPS), an adaptive parameter set (APS), an intra period level, a group of pictures (GOP) level, a temporal layer level in a GOP, a picture level, a slice level, a coding tree unit (CTU) level, or a grid level for a grid of the picture.

Clause 44: The device of clause 40, wherein the one or more processors are configured to partition the picture according to a grid, wherein the portion comprises an element of the grid of the picture.

Clause 45: The device of clause 44, wherein the one or more processors are further configured to decode a value for a syntax element representing a number of elements of the grid, the syntax element being included in at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 46: The device of clause 40, wherein the one or more processors are configured to determine to apply the neural network model prior to determining the neural network model, wherein to determine to apply the neural network model, the one or more processors are configured to decode a value for a syntax element indicating that the neural network model is to be applied.

Clause 47: The device of clause 40, wherein the portion of the decoded picture comprises a portion of a color component of the decoded picture, the color component comprising one of a luminance component, a blue hue chrominance component, or a red hue chrominance components.

Clause 48: The device of clause 40, wherein the value for the syntax element comprises a quantization parameter (QP) for the portion of the picture.

Clause 49: The device of clause 40, wherein the one or more processors are further configured to encode the picture prior to decoding the picture, and wherein to code the value for the syntax element, the one or more processors are configured to encode the value for the syntax element.

Clause 50: The device of clause 49, wherein the one or more processors are further configured to determine the neural network model according to a rate-distortion computation.

Clause 51: The device of clause 40, further comprising a display configured to display the decoded video data.

Clause 52: The device of clause 40, wherein the device comprises one or more of a camera, a computer, a mobile device, a broadcast receiver device, or a set-top box.

Clause 53: A computer-readable storage medium having stored thereon instructions that, when executed, cause a processor to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

Clause 54: The computer-readable storage medium of clause 53, further comprising instructions that cause the processor to code a value representing a subset of the set of pre-defined neural network models, the neural network model being one of the subset of the set of pre-defined neural network models, the subset being smaller than the set of pre-defined neural network models.

Clause 55: The computer-readable storage medium of clause 53, wherein the value for the syntax element representing the neural network model is a value representing a plurality of neural network models, and wherein the instructions that cause the processor to filter the portion of the decoded picture comprise instructions that cause the processor to: separately apply each of the plurality of neural network models represented by the value to the portion to form distinct results; and combine each of the results to form a final filtered portion.

Clause 56: The computer-readable storage medium of clause 53, wherein the instructions that cause the processor to code the value for the syntax element comprise instructions that cause the processor to code the value for the syntax element in one of a video parameter set (VPS), a sequence parameter set (SPS), a picture parameter set (PPS), an adaptive parameter set (APS), an intra period level, a group of pictures (GOP) level, a temporal layer level in a GOP, a picture level, a slice level, a coding tree unit (CTU) level, or a grid level for a grid of the picture.

Clause 57: The computer-readable storage medium of clause 53, further comprising instructions that cause the processor to partition the picture according to a grid, wherein the portion comprises an element of the grid of the picture.

Clause 58: The computer-readable storage medium of clause 57, further comprising instructions that cause the processor to decode a value for a syntax element representing a number of elements of the grid, the syntax element being included in at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 59: The computer-readable storage medium of clause 53, further comprising instructions that cause the processor to determine to apply the neural network model prior to determining the neural network model, wherein the instructions that cause the processor to determine to apply the neural network model comprise instructions that cause the processor to decode a value for a syntax element indicating that the neural network model is to be applied.

Clause 60: The computer-readable storage medium of clause 53, wherein the portion of the decoded picture comprises a portion of a color component of the decoded picture, the color component comprising one of a luminance component, a blue hue chrominance component, or a red hue chrominance components.

Clause 61: The computer-readable storage medium of clause 53, wherein the value for the syntax element comprises a quantization parameter (QP) for the portion of the picture.

Clause 62: The computer-readable storage medium of clause 53, further comprising instructions that cause the processor to encode the picture prior to decoding the picture, and wherein the instructions that cause the processor to code the value for the syntax element comprise instructions that cause the processor to encode the value for the syntax element.

Clause 63: The computer-readable storage medium of clause 62, further comprising instructions that cause the processor to determine the neural network model according to a rate-distortion computation.

Clause 64: A device for filtering decoded video data, the device comprising: means for decoding a picture of video data; means for coding a value for a syntax element representing a neural network model to be used to filter a portion of the decoded picture, the value representing an index into a set of pre-defined neural network models, the index corresponding to the neural network model in the set of pre-defined neural network models; and means for filtering the portion of the decoded picture using the neural network model corresponding to the index.

Clause 65: A method of filtering decoded video data, the method comprising: decoding a picture of video data; coding a value for a syntax element representing a neural network model to be used to filter a portion of the decoded picture, the value representing an index into a set of pre-defined neural network models, the index corresponding to the neural network model in the set of pre-defined neural network models; and filtering the portion of the decoded picture using the neural network model corresponding to the index.

Clause 66: The method of clause 65, further comprising coding a value representing a subset of the set of pre-defined neural network models, the neural network model being one of the subset of the set of pre-defined neural network models, the subset being smaller than the set of pre-defined neural network models.

Clause 67: The method of any of clauses 65 and 66, wherein the value for the syntax element representing the neural network model is a value representing a plurality of neural network models.

Clause 68: The method of clause 67, wherein filtering comprises: separately applying each of the plurality of neural network models represented by the value to the portion to form distinct results; and combining each of the results to form a final filtered portion.

Clause 69: The method of any of clauses 65-68, wherein coding the value for the syntax element comprises coding the value for the syntax element in one of a video parameter set (VPS), a sequence parameter set (SPS), a picture parameter set (PPS), an adaptive parameter set (APS), an intra period level, a group of pictures (GOP) level, a temporal layer level in a GOP, a picture level, a slice level, a coding tree unit (CTU) level, or a grid level for a grid of the picture.

Clause 70: The method of any of clauses 65-69, further comprising partitioning the picture according to a grid, wherein the portion comprises an element of the grid of the picture.

Clause 71: The method of clause 70, further comprising determining a number of elements of the grid.

Clause 72: The method of clause 71, wherein determining the number of elements of the grid comprises decoding a syntax element of at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 73: The method of clause 71, wherein determining the number of elements in the grid comprises decoding a value of a syntax element representing an index into a set of possible grid sizes.

Clause 74: The method of any of clauses 65-73, further comprising determining to apply the neural network model prior to determining the neural network model.

Clause 75: The method of clause 74, wherein determining to apply the neural network model comprises decoding a value for a syntax element indicating that the neural network model is to be applied.

Clause 76: The method of clause 75, wherein the syntax element is of at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 77: The method of any of clauses 65-76, wherein the portion of the decoded picture comprises a portion of a color component of the decoded picture, the color component comprising one of a luminance component, a blue hue chrominance component, or a red hue chrominance components.

Clause 78: The method of clause 77, further comprising coding a syntax element that jointly represents filtering using the neural network model for each of the color components of the decoded picture.

Clause 79: The method of any of clauses 65-78, wherein the value for the syntax element comprises a quantization parameter (QP) for the portion of the picture.

Clause 80: The method of clause 65, further comprising encoding the picture prior to decoding the picture, wherein coding the value for the syntax element comprises encoding the value for the syntax element.

Clause 81: The method of clause 80, further comprising determining the neural network model according to a rate-distortion computation.

Clause 82: A device for filtering decoded video data, the device comprising: a memory configured to store video data; and one or more processors implemented in circuitry and configured to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

Clause 83: The device of clause 82, wherein the one or more processors are further configured to code a value representing a subset of the set of pre-defined neural network models, the neural network model being one of the subset of the set of pre-defined neural network models, the subset being smaller than the set of pre-defined neural network models.

Clause 84: The device of any of clauses 82 and 83, wherein the value for the syntax element representing the neural network model is a value representing a plurality of neural network models, and wherein to filter the portion of the decoded picture, the one or more processors are configured to: separately apply each of the plurality of neural network models represented by the value to the portion to form distinct results; and combine each of the results to form a final filtered portion.

Clause 85: The device of any of clauses 82-84, wherein the one or more processors are configured to code the value for the syntax element in one of a video parameter set (VPS), a sequence parameter set (SPS), a picture parameter set (PPS), an adaptive parameter set (APS), an intra period level, a group of pictures (GOP) level, a temporal layer level in a GOP, a picture level, a slice level, a coding tree unit (CTU) level, or a grid level for a grid of the picture.

Clause 86: The device of any of clauses 82-85, wherein the one or more processors are configured to partition the picture according to a grid, wherein the portion comprises an element of the grid of the picture.

Clause 87: The device of clause 86, wherein the one or more processors are further configured to decode a value for a syntax element representing a number of elements of the grid, the syntax element being included in at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 88: The device of any of clauses 82-87, wherein the one or more processors are configured to determine to apply the neural network model prior to determining the neural network model, wherein to determine to apply the neural network model, the one or more processors are configured to decode a value for a syntax element indicating that the neural network model is to be applied.

Clause 89: The device of any of clauses 82-88, wherein the portion of the decoded picture comprises a portion of a color component of the decoded picture, the color component comprising one of a luminance component, a blue hue chrominance component, or a red hue chrominance components.

Clause 90: The device of any of clauses 82-89, wherein the value for the syntax element comprises a quantization parameter (QP) for the portion of the picture.

Clause 91: The device of clause 82, wherein the one or more processors are further configured to encode the picture prior to decoding the picture, and wherein to code the value for the syntax element, the one or more processors are configured to encode the value for the syntax element.

Clause 92: The device of clause 91, wherein the one or more processors are further configured to determine the neural network model according to a rate-distortion computation.

Clause 93: The device of any of clauses 82-92, further comprising a display configured to display the decoded video data.

Clause 94: The device of any of clauses 82-93, wherein the device comprises one or more of a camera, a computer, a mobile device, a broadcast receiver device, or a set-top box.

Clause 95: A computer-readable storage medium having stored thereon instructions that, when executed, cause a processor to: decode a picture of video data; code a value for a syntax element representing a neural network model to be used to filter a portion of the decoded picture, the value representing an index into a set of pre-defined neural network models, the index corresponding to the neural network model in the set of pre-defined neural network models; and filter the portion of the decoded picture using the neural network model corresponding to the index.

Clause 96: The computer-readable storage medium of clause 95, further comprising instructions that cause the processor to code a value representing a subset of the set of pre-defined neural network models, the neural network model being one of the subset of the set of pre-defined neural network models, the subset being smaller than the set of pre-defined neural network models.

Clause 97: The computer-readable storage medium of any of clauses 95 and 96, wherein the value for the syntax element representing the neural network model is a value representing a plurality of neural network models, and wherein the instructions that cause the processor to filter the portion of the decoded picture comprise instructions that cause the processor to: separately apply each of the plurality of neural network models represented by the value to the portion to form distinct results; and combine each of the results to form a final filtered portion.

Clause 98: The computer-readable storage medium of any of clauses 95-97, wherein the instructions that cause the processor to code the value for the syntax element comprise instructions that cause the processor to code the value for the syntax element in one of a video parameter set (VPS), a sequence parameter set (SPS), a picture parameter set (PPS), an adaptive parameter set (APS), an intra period level, a group of pictures (GOP) level, a temporal layer level in a GOP, a picture level, a slice level, a coding tree unit (CTU) level, or a grid level for a grid of the picture.

Clause 99: The computer-readable storage medium of any of clauses 95-98, further comprising instructions that cause the processor to partition the picture according to a grid, wherein the portion comprises an element of the grid of the picture.

Clause 100: The computer-readable storage medium of clause 99, further comprising instructions that cause the processor to decode a value for a syntax element representing a number of elements of the grid, the syntax element being included in at least one of a video parameter set (VPS), a sequence parameter set (SPS), a picture parameter set (PPS), a picture header, a slice header, an adaptation parameter set (APS), an intra period level, a group of pictures (GOP) level, a temporal layer level in the GOP, a picture level, a slice level, a coding tree unit (CTU) level, or a grid size level.

Clause 101: The computer-readable storage medium of any of clauses 95-100, further comprising instructions that cause the processor to determine to apply the neural network model prior to determining the neural network model, wherein the instructions that cause the processor to determine to apply the neural network model comprise instructions that cause the processor to decode a value for a syntax element indicating that the neural network model is to be applied.

Clause 102: The computer-readable storage medium of any of clauses 95-101, wherein the portion of the decoded picture comprises a portion of a color component of the decoded picture, the color component comprising one of a luminance component, a blue hue chrominance component, or a red hue chrominance components.

Clause 103: The computer-readable storage medium of any of clauses 95-102, wherein the value for the syntax element comprises a quantization parameter (QP) for the portion of the picture.

Clause 104: The computer-readable storage medium of any of clauses 95-103, further comprising instructions that cause the processor to encode the picture prior to decoding the picture, and wherein the instructions that cause the processor to code the value for the syntax element comprise instructions that cause the processor to encode the value for the syntax element.

Clause 105: The computer-readable storage medium of clause 104, further comprising instructions that cause the processor to determine the neural network model according to a rate-distortion computation.

Clause 106: A device for filtering decoded video data, the device comprising: means for decoding a picture of video data; means for coding a value for a syntax element representing a neural network model to be used to filter a portion of the decoded picture, the value representing an index into a set of pre-defined neural network models, the index corresponding to the neural network model in the set of pre-defined neural network models; and means for filtering the portion of the decoded picture using the neural network model corresponding to the index.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a picture of video data to form a decoded picture;
    determining a quantization parameter (QP) value;
    determining a plurality of neural network models to be used to filter at least a portion of the decoded picture using the QP value, the QP value representing an index into a set of pre-defined neural network models, the index corresponding to the neural network models in the set of pre-defined neural network models;
    filtering the at least portion of the decoded picture using the neural network models corresponding to the index represented by the QP value, comprising separately applying each of the determined neural networks to form distinct results; and combining each of the results to form a final filtered portion.

2. The method of claim 1, wherein the QP value comprises a QP for the picture.

3. The method of claim 1, wherein the QP value comprises a QP value for a reference picture of the picture.

4. The method of claim 1, wherein the picture is included in a group of pictures (GOP), and wherein the QP value is for a second, different picture in the GOP.

5. The method of claim 1, wherein the picture is included in an intra period, and wherein the QP value is for a second, different picture in the intra period.

6. The method of claim 1, wherein the at least portion of the decoded picture comprises a slice of the decoded picture, and wherein the QP value comprises a QP value for the slice.

7. The method of claim 1, wherein the at least portion of the decoded picture comprises a block of the decoded picture, and wherein the QP value comprises a QP value for the block.

8. The method of claim 1, wherein the QP value comprises a model selection QP value.

9. A device for decoding video data, the device comprising:
    a memory configured to store video data; and
    a processing system comprising one or more processors implemented in circuitry, the processing system being configured to:
    decode a picture of video data to form a decoded picture;
    determine a quantization parameter (QP) value;
        determine a plurality of neural network models to be used to filter at least a portion of the decoded picture using the QP value, the QP value representing an index into a set of pre-defined neural network models, the index corresponding to the neural network models in the set of pre-defined neural network models; and
        filter the at least portion of the decoded picture using the neural network models corresponding to the index represented by the QP value, the processing system being further configured to separately apply each of the determined neural network models to form distinct results; and combine each of the results to form a final filtered portion.

10. The device of claim 9, wherein the QP value comprises a QP for the picture.

11. The device of claim 9, wherein the QP value comprises a QP value for a reference picture of the picture.

12. The device of claim 9, wherein the picture is included in a group of pictures (GOP), and wherein the QP value is for a second, different picture in the GOP.

13. The device of claim 9, wherein the picture is included in an intra period, and wherein the QP value is for a second, different picture in the intra period.

14. The device of claim 9, wherein the at least portion of the decoded picture comprises a slice of the decoded picture, and wherein the QP value comprises a QP value for the slice.

15. The device of claim 9, wherein the at least portion of the decoded picture comprises a block of the decoded picture, and wherein the QP value comprises a QP value for the block.

16. The device of claim 9, wherein the QP value comprises a model selection QP value.

17. The device of claim 9, further comprising a display configured to display the decoded video data.

18. The device of claim 9, wherein the device comprises one or more of a camera, a computer, a mobile device, a broadcast receiver device, or a set-top box.

19. The device of claim 9, further comprising a memory configured to store the video data.

* * * * *